US008039992B2

(12) United States Patent
Masubuchi

(10) Patent No.: US 8,039,992 B2
(45) Date of Patent: Oct. 18, 2011

(54) SERIES CONNECTION APPARATUS FOR GENERATORS

(75) Inventor: Yoshinori Masubuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 234 days.

(21) Appl. No.: 12/565,123

(22) Filed: Sep. 23, 2009

(65) Prior Publication Data

US 2010/0090535 A1   Apr. 15, 2010

(30) Foreign Application Priority Data

Oct. 9, 2008 (JP) ................................. 2008-262466

(51) Int. Cl.
*H02J 1/00* (2006.01)
(52) U.S. Cl. .......................................................... 307/84
(58) Field of Classification Search ...................... 307/84
See application file for complete search history.

(56) References Cited

U.S. PATENT DOCUMENTS 4,035,659 A * 7/1977 Jeppson ........................... 307/84

FOREIGN PATENT DOCUMENTS

JP      08-205543 A      8/1996

* cited by examiner

*Primary Examiner* — Robert L. Deberadinis
(74) *Attorney, Agent, or Firm* — Arent Fox LLP

(57) ABSTRACT

In an apparatus for series-connecting at least two engine generators driven by an internal engine and each generates and outputs alternating current through single-phase two-wire output terminals, there are equipped with a magnetic coupler such as transformer that can magnetically couple the single-phase two-wire output terminals of the generators with the primary side and the secondary side, and a connector that can connect one of the single-phase two-wire output terminals of one of the generators and one of the single-phase two-wire output terminals of other of the generators. With this, single-phase three-wire output terminals are formed by the single-phase two-wire output terminals of the generators using the connector as a neutral line, without a communication line.

7 Claims, 3 Drawing Sheets

SERIES CONNECTION APPARATUS FOR GENERATORS

BACKGROUND OF THE INVENTION

1. Field of the Invention

This invention relates to a series connection apparatus for generators and a single-phase three-wire output apparatus for a generator.

2. Description of the Related Art

There is known a generator, e.g., an engine generator equipped with an inverter that once converts alternating current outputted by an engine-driven generator unit to direct current and then converts the direct current into alternating current of a predetermined frequency (utility frequency) by driving switching elements with a PWM signal generated using a reference sine wave of a desired output voltage waveform and a carrier. Also a technique to connect two such the engine generators for parallel running is known, as taught by Japanese Laid-Open Patent Application No. Hei 8 (1996)-205543.

When the two generators are connected in parallel (or in series) as taught in the publication, it is necessary to conduct phase synchronous operation for synchronizing phases of alternating current outputs and, since inputting an output of one of the two generators through a signal line may cause short circuit, an additional communication line is required.

SUMMARY OF THE INVENTION

When synchronizing the phases of alternating current outputs generated by the generators interconnected through the communication line, the resulting output is not a single phase three-wire AC output for domestic use but a single-phase two-wire AC output. This can be applied not only to an engine generator but also to a fuel cell or the like.

A first object of this invention is therefore to overcome the aforesaid problem by providing a series connection apparatus for generators that series-connects generators made adaptable to phase synchronous operation, thereby acquiring a single-phase three-wire AC output without a communication line.

Further, considering the case where there is a demand of single-phase three-wire AC output, it is preferable that a single generator can generate a single-phase three-wire AC output by itself without another generator connected thereto in series.

A second object of this invention is therefore to overcome the aforesaid problem by providing a single-phase three-wire output apparatus for a generator that enables to acquire a single-phase three-wire AC output by a single generator.

In order to achieve the first object, this invention provides an apparatus for series-connecting at least two generators respective of which generates and outputs alternating current through single-phase two-wire output terminals, and is made adaptable to phase synchronous operation for synchronizing phases of alternating current outputted from the single phase two-wire output terminals, comprising: a magnetic coupler that has a primary side and a secondary side, and is adapted to magnetically couple the single-phase two-wire output terminals of the generators with the primary side and the secondary side; and a connector that is adapted to connect one of the single-phase two-wire output terminals of one of the generators and one of the single-phase two-wire output terminals of other of the generators, such that single-phase three-wire output terminals being formed by the single-phase two-wire output terminals of the generators using the connector as a neutral line.

In order to achieve the second object, this invention provides a single-phase three-wire output apparatus for a generator that generates and outputs alternating current through single-phase two-wire output terminals, comprising: pseudo two-wire output terminals; a magnetic coupler that has a primary side and a secondary side, and is adapted to magnetically couple the single-phase two-wire output terminals with the primary side and the pseudo two-wire output terminals with the secondary side; and a connector that is adapted to connect one of the single-phase two-wire output terminals of the generator and one of the pseudo two-wire output terminals, such that single-phase three-wire output terminals being formed by the single-phase two-wire output terminals and the pseudo two-wire output terminals using the connector as a neutral line.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A series connection apparatus for generators or the like according to embodiments of this invention will now be explained with reference to the attached drawings.

Figure 1:
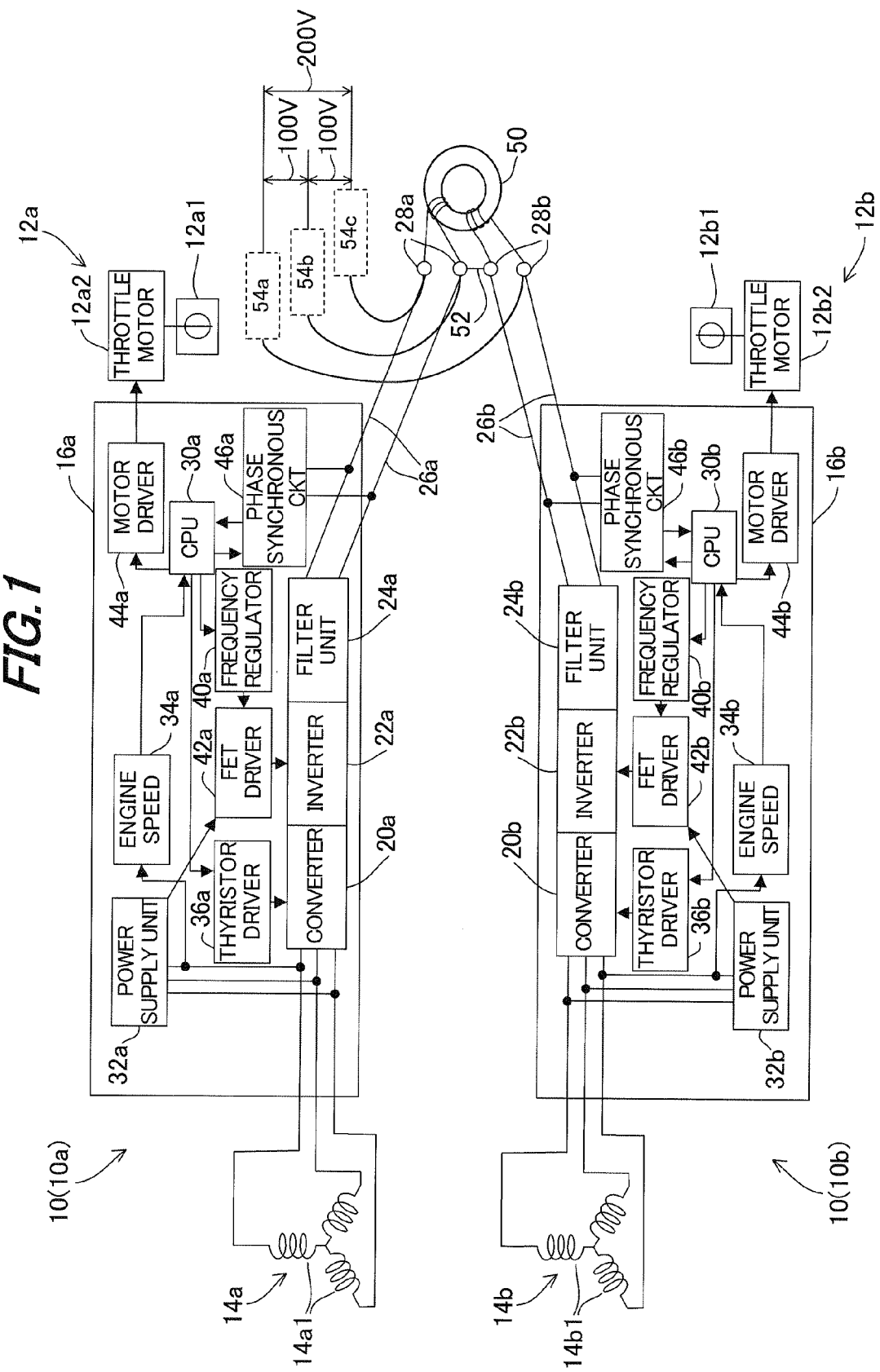
FIG. 1 is a block diagram giving an overview of a series connection apparatus for generators according to a first embodiment of this invention.

FIG. 1 is a block diagram giving an overview of a series connection apparatus for generators according to a first embodiment of this invention. An engine generator is exemplified as the generator.

In FIG. 1, reference numeral 10 designates the engine generators (hereinafter simply called the "generators"). The generators 10 include at least two generators, precisely a first generator 10a which is a master, and a second generator 10b which is a slave.

Since the first and second generators are the same model, the first generator 10 is taken as an example here and constituent elements thereof will be explained by adding a to their reference numeral. The following explanation can be applied to the second generator 10b if the symbol a is replaced by b.

The first generator 10a is equipped with an engine (internal combustion engine) 12a and driven by the engine 12a. The first generator 10a has a rated output of about 3 kW (AC 100 V, 30 A). The engine 12a is an air-cooled, spark-ignition engine. Its throttle valve 12a1 is opened and closed by a throttle motor (actuator) 12a2 constituted as a stepper motor for regulating quantity of fuel supplied from a carburetor (not shown). The engine 12a is started with a recoil starter (not shown).

A circular stator (not shown) is fastened near the cylinder head of the engine 12a. The stator is provided with windings that constitute an engine generator unit 14a, namely with three-phase (U, V and W) output windings (main windings) 14a1.

A rotor (not shown) that also functions as the flywheel of the engine 12a is installed in the outside of the stator. A plurality of permanent magnet pieces (not shown) are attached in the rotor at positions opposite the aforesaid windings 14a1 etc., and with their radially oriented polarities reversed alternately. When the permanent magnet pieces of the rotor surrounding the stator rotate, three-phase (U, V and W phase) alternating current is outputted from (generated by) the three-phase output windings 14a1.

The three-phase alternating current outputted from (generated by) the output windings 14a1 of the generator unit 14a is sent to a control board (printed board) 16a and inputted to a converter 20a mounted thereon. The converter 20a is equipped with bridge-connected three thyristors (SCRs) and three diodes. The three-phase alternating current outputted by the generator unit 14a is converted to direct current by controlling the turn-on or conducting angles of the thyristors.

Although not illustrated, a regulated power supply of direct current, such as a ringing choke converter (RCC), is connected to the positive and negative electrode side outputs of the converter 20a to supply the rectified DC power to the three thyristors as operating power. A smoothing capacitor is connected downstream of the power supply to smooth the direct current outputted from the converter 20a. The converter 20a is connected to an inverter 22a.

Although not illustrated similarly, the inverter 22a is equipped with a four-FET bridge circuit (FET: field effect transistor (switching element)). The direct current outputted from the converter 20a is converted to alternating current of a predetermined frequency (50 Hz or 60 Hz utility power frequency) by being controlled the conducting (ON-OFF) state of the four FETs.

The AC output of the inverter 22a is passed through a choke coil composed of an LC filter for harmonic suppression and a filter unit 24a having a noise filter for noise suppression, and then through two power lines to single-phase two-wire output terminals 28a, from which it is outputted. Thus, the first generator 10a is a generator that outputs generated alternating current from the single-phase two-wire output terminals 28a, more exactly an inverter generator.

The control board 16a is equipped with a CPU (central processing unit) 30a. A part of three-phase alternating current outputted from (generated by) the output windings 14a1 of the generator unit 14a is branched to be sent to a power supply unit 32a and engine speed signal generation unit 34a.

The power supply unit 32a having a configuration similar to that of the converter 20a, converts alternating current to direct current and supplies it to the CPU 30a, etc., as operating power. The engine speed signal generation unit 34a shapes an inputted waveform to generate a pulse signal and output it to the CPU 30a.

The CPU 30a has a 32-bit storage capacity. The CPU 30a controls the turn-on angle of the thyristors of the converter 20a through a thyristor (SCR) driver (drive circuit) 36a, and controls the turn-on or turn-off of the FETs of the inverter 22a through a frequency regulator 40a for regulating the predetermined frequency and an FET driver 42a. And it controls the operation of the throttle motor 12a2 through a motor driver 44a.

The control board 16a is installed with a phase synchronous circuit 46a that synchronizes phases of AC outputted from the single-phase two-wire output terminals 28a, 28b of the first and second generators 10a, 10b in accordance with a command of the CPU 30a, which will be explained later.

In FIG. 1, reference numeral 50 designates a magnetic coupler, specifically a single transformer, more exactly a single toroidal transformer (hereinafter called the "transformer").

The output terminals 28a of the power lines 26a of the first generator 10a are magnetically coupled or connected to the primary side of the transformer 50 and the output terminals 28b of the power lines 26b of the second generator 10b are magnetically coupled or connected to the secondary side of the transformer 50. The turn ratio (ratio of winding) of the primary side to the secondary side of the transformer 50 is 1:1 (i.e., the number of turns in the primary side and that in the secondary side are the same). Although the first generator 10a is connected to the primary side and the second generator 10b to the secondary side in this embodiment, it may be vice versa.

As illustrated, one of the output terminals 28a of the first generator 10a and one of the output terminals 28b of the second generator 10b are interconnected by a connector (connecting line) 52 and are made common or shared. Thus the generators 10a, 10b comprise the single-phase two-wire output terminals 28a of the first generator 10a and the single-phase two-wire output terminals 28b of the second generator 10b, whereby single-phase three-wire output terminals 54a, 54b, 54c using the connector 52 as a neutral line are formed.

More specifically, the other of the output terminals 28b of the second generator 10b is extended to form the single-phase three-wire output terminal 54a and the other of the output terminals 28a of the first generator 10a is extended to form the single-phase three-wire output terminal 54c. The connector 52 (precisely the ones of the output terminals 28a, 28b of the generators 10a, 10b interconnected by the connector 52) is extended to form the single-phase three-wire output terminal (neutral point) 54b.

Figure 2:
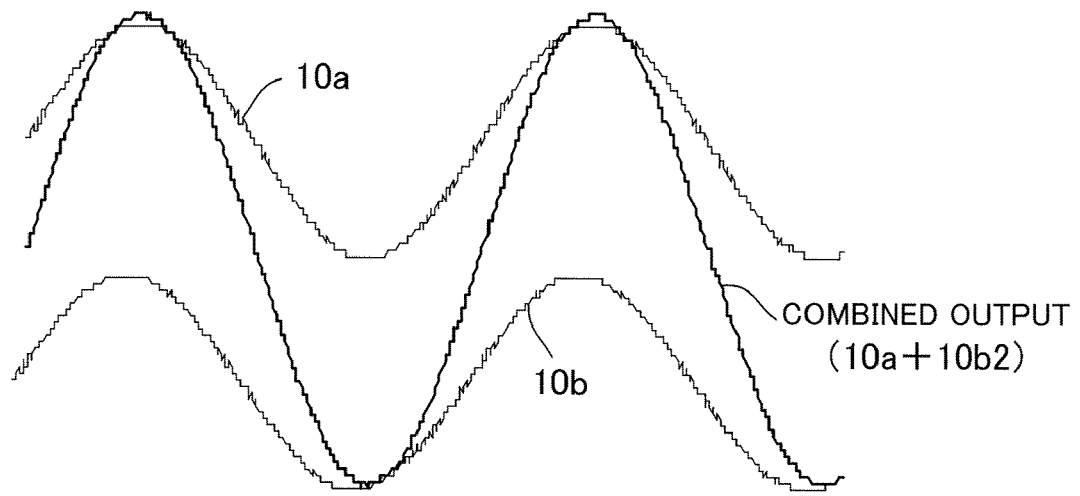
FIG. 2 is a waveform diagram of outputs when a first and second generators shown in FIG. 1 are connected in series.

Although the generators 10a, 10b can originally generate a single-phase two-wire output of 100 V (60 A) in parallel connection and that of 200 V (30 A) in series connection as shown in FIG. 2, the above configuration further enables to acquire the single-phase three-wire output of 200 V (30 A).

The phase synchronous circuits 46a, 46b will be explained. The phase synchronous circuit 46a of the first generator 10a is connected to the power lines 26a and the phase synchronous circuit 46b of the second generator 10b to the power lines 26b.

Figure 3:
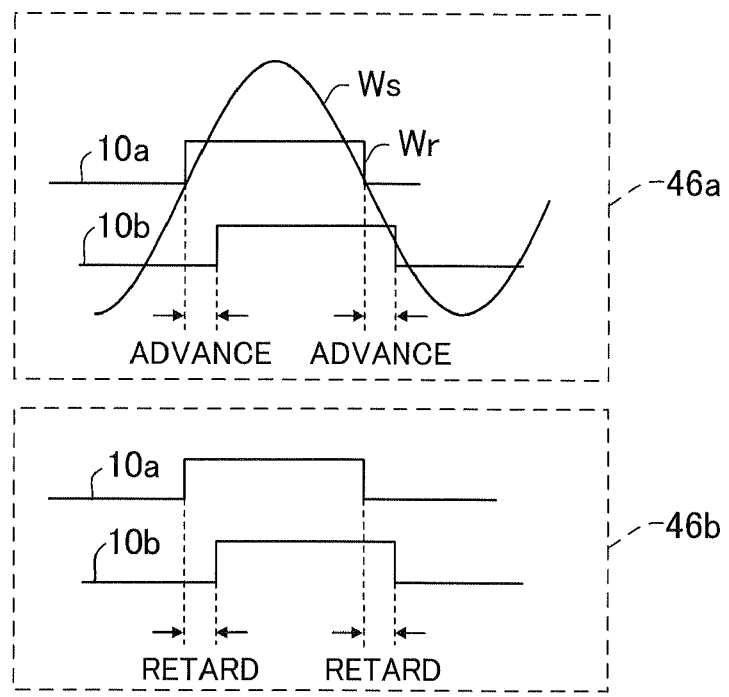
FIG. 3 is an explanatory view for explaining the operation of phase synchronous circuits shown in FIG. 1.

FIG. 3 is an explanatory view for explaining the operation of the phase synchronous circuit 46a, 46b.

As illustrated, in accordance with commands from the CPUs 30a, 30b, the circuits 46a, 46b each converts its outputting sine wave Ws to a square wave Wr to be transferred to the other of the circuits 46b or 46a for comparing its own square wave with a square wave received from the other.

When one of the circuits 46a, 46b is determined to be in advance of the other, a pulse is added to make a period of the outputting sine wave retard, while, when the one is determined to be in retard of the other, a pulse is subtracted to make a period of the sine wave advance. Thus the phase synchronous circuits 46a, 46b maintain the synchronous state by synchronizing phases at every half period of output frequency.

As described in the foregoing, since the power lines 26a, 26b are magnetically connected to the transformer 50, the power lines 26a, 26b function as signal lines that send/receive signals in addition to functioning as power lines that output alternating current.

As a result, paying an attention to one of the circuits 46a, 46b of the first and second generators 10a, 10b, for instance, the circuit 46a can input the square wave outputted by the circuit 46b of the second generator 10b without causing short circuit, and also can output its own square wave to the circuit 46b, and vice versa.

As stated above, the first embodiment is configured to have an apparatus for series-connecting at least two generators (10a, 10b) respective of which generates and outputs alternating current through single-phase two-wire output terminal (28a, 28b), and is made adaptable to phase synchronous operation for synchronizing phases of alternating current outputted from the single phase two-wire output terminals, comprising: a magnetic coupler (transformer) 50 that has a primary side and a secondary side, and magnetically couples the single-phase two-wire output terminals of the generators with the primary side and the secondary side; and a connector (52) that connects one of the single-phase two-wire output terminals (28a, 28b) of one of the generators (10a, 10b) and one of the single-phase two-wire output terminals (28a, 28b) of other of the generators (10a, 10b), such that single-phase three-wire output terminals (28a, 28b) being formed by the single-phase two-wire output terminals (54a, 54b, 54c) of the generators using the connector (52) as a neutral line (54b).

Specifically, the generators (10a, 10b) are engine generators each driven by an internal combustion engine (12a, 12b) and each comprising: an engine generator unit (14a, 14b) that generates an alternating current when driven by the engine; a converter (20a, 20b) that is connected to the engine generator and converts the generated alternating current to a direct current; and an inverter (22a, 22b) that is connected to the converter and inverts the direct current to a single-phase alternating current; and the single-phase two-wire output terminals (28a, 28b) are connected to the inverter to output the inverted single-phase alternating current.

And the apparatus further includes: a phase synchronous circuit (46a, 46b) that synchronizes the phase of the outputted alternating current with that of the other generator.

With this, it becomes possible to acquire a single-phase three-wire AC output for domestic use without using a communication line by series-connecting generators 10a, 10b made adaptable to the phase synchronous operation.

Further, since the first and second generators 10a, 10b can generate a single-phase three-wire output in addition to generating a single-phase two-wire output in parallel or series connection, it becomes possible to satisfy any of demands for single-phase two-wire output and single-phase three-wire output. Also, the number of the generators is two, thereby enhancing portability.

Further, it becomes possible for a user who possesses only the first generator 10a to acquire a single-phase three-wire output by additionally purchasing a generator of the same model. Preparing a plurality of generators of the same model as the first and second generators 10a, 10b also makes possible to respond the above demands more flexibly.

Furthermore, in the apparatus, the magnetic coupler (50) comprises a single transformer (toroidal transformer) whose turn ratio of the primary side to the secondary side is 1:1.

With this, the structure can be simple. Specifically, since it suffices as the transformer 50 if the output frequencies can be synchronized by magnetic coupling, the load capacity is made less significant. And use of the toroidal transformer makes the structure compact, thereby achieving the decrease in weight.

Although, needless to say, power is supplied through the transformer 50 and the load capacity of the transformer should be determined in accordance with usage as the generator, if the single-phase three-wire load is balanced, the phase synchronous operation merely requires the capacity of one tenth or thereabout of the power output. Therefore, the transformer can be compact.

Figure 4:
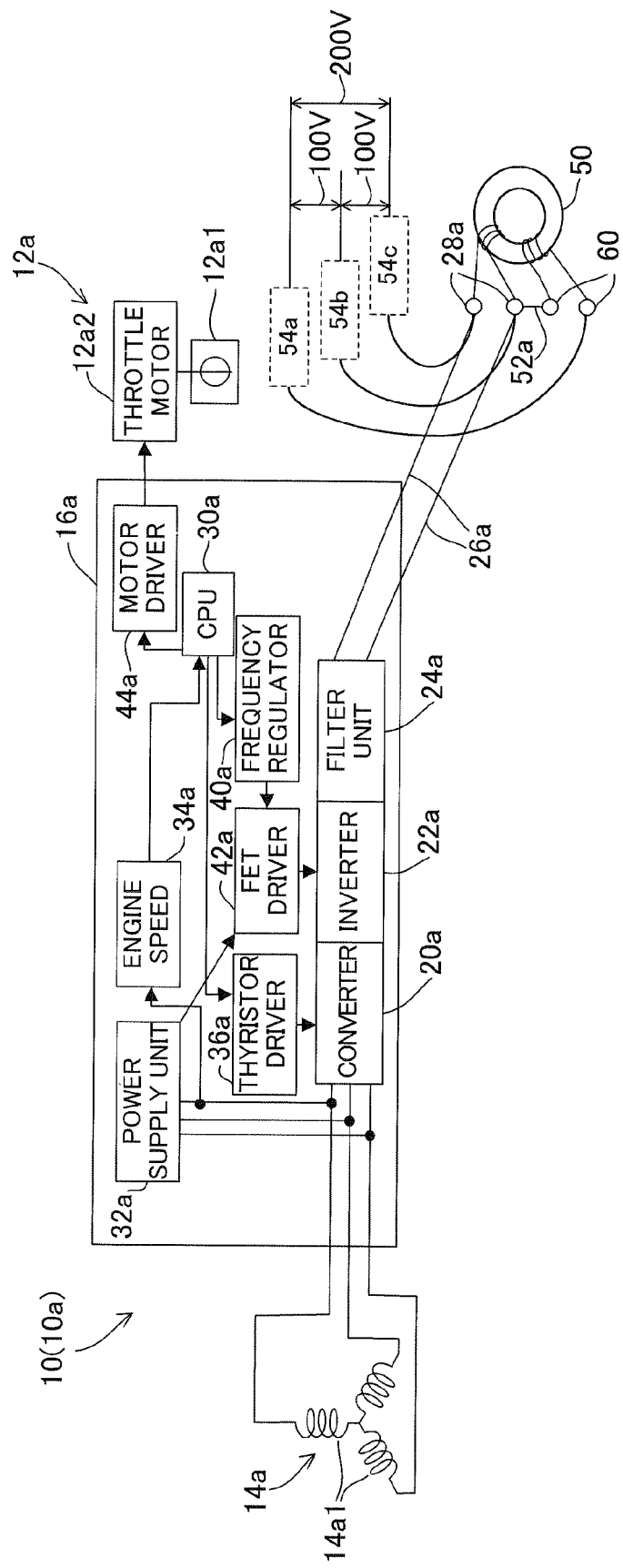
FIG. 4 is a block diagram similar to FIG. 1, but giving an overview of a single-phase three-wire output apparatus for a generator according to a second embodiment of this invention.

FIG. 4 is a block diagram similar to FIG. 1, but giving an overview of a single-phase three-wire output apparatus for a generator according to a second embodiment of this invention.

The explanation will focus on the points of difference from the first embodiment. The second embodiment is configured to have only the first generator 10a as a generator and further have pseudo two-wire output terminals 60, in which the single-phase two-wire output terminals 28a are magnetically coupled or connected to the primary side and the pseudo terminals 60 are magnetically coupled or connected to the secondary side, respectively.

Specifically, in the second embodiment, there is provided a connector 52a for interconnecting one of the output terminals 28a of the first generator 10a and one of the pseudo terminals 60, whereby single-phase three-wire output terminals 54a, 54b, 54c using the connector 52a as a neutral line are formed.

Since only one generator, i.e., the first generator 10a is provided in the second embodiment, the phase synchronous circuit 46a is removed. The remaining configuration is the same as that in the first embodiment.

As stated above, the second embodiment is configured to have a single-phase three-wire output apparatus for a generator (10a) that generates and outputs alternating current through single-phase two-wire output terminals (28a), comprising: pseudo two-wire output terminals (60); a magnetic coupler (transformer) (50) that has a primary side and a secondary side, and magnetically couples the single-phase two-wire output terminals with the primary side and the pseudo two-wire output terminals with the secondary side; and a connector (52a) that connects one of the single-phase two-wire output terminals (28a) of the generator (10a) and one of the pseudo two-wire output terminals (60), such that single-phase three-wire output terminals (54a, 54b, 54c) being formed by the single-phase two-wire output terminals (28a) and the pseudo two-wire output terminals (60) using the connector (52a) as a neutral line (54b).

Specifically, the generator (10a) is an engine generator driven by an internal combustion engine (12a) and comprising: an engine generator unit (14a) that generates an alternating current when driven by the engine; a converter (20a) that is connected to the engine generator and converts the generated alternating current to a direct current; and an inverter (22a) that is connected to the converter and inverts the direct current to a single-phase alternating current; and the single-phase two-wire output terminals (28a) are connected to the inverter to output the inverted single-phase alternating current.

In the apparatus, the magnetic coupler (50) comprises a single transformer (toroidal transformer) whose turn ratio of the primary side to the secondary side is 1:1.

With this, it becomes possible to acquire a single-phase three-wire AC output by a single generator.

It should be noted that, in the foregoing, although the first and second generators 10a, 10b are exemplified, a third generator or more generators can be provided.

Although an engine generator is used as an example of the generator, it should not be limited thereto and a fuel cell or the like can be utilized instead.

Although the transformer, i.e., the toroidal transformer is taken as an example of the magnetic coupler, it may be any component capable of magnetic coupling. For instance, an electronic transformer, precisely, an electronically-controlled AC-AC converter may be utilized.

Japanese Patent Application No. 2008-262466 filed on Oct. 9, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for series-connecting at least two generators respective of which generates and outputs alternating current through single-phase two-wire output terminals, and is made adaptable to phase synchronous operation for synchronizing phases of alternating current outputted from the single phase two-wire output terminals, comprising:
   a magnetic coupler that has a primary side and a secondary side, and is adapted to magnetically couple the single-phase two-wire output terminals of the generators with the primary side and the secondary side; and
   a connector that is adapted to connect one of the single-phase two-wire output terminals of one of the generators and one of the single-phase two-wire output terminals of other of the generators, such that single-phase three-wire output terminals being formed by the single-phase two-wire output terminals of the generators using the connector as a neutral line.

2. The apparatus according to claim 1, wherein the magnetic coupler comprises a single transformer whose turn ratio of the primary side to the secondary side is 1:1.

3. The apparatus according to claim 1, wherein the generators are engine generators each driven by an internal combustion engine and each comprising:
   an engine generator unit that generates an alternating current when driven by the engine;
   a converter that is connected to the engine generator and converts the generated alternating current to a direct current; and
   an inverter that is connected to the converter and inverts the direct current to a single-phase alternating current;
   and the single-phase two-wire output terminals are connected to the inverter to output the inverted single-phase alternating current.

4. The apparatus according to claim 3, further including:
   a phase synchronous circuit that synchronizes the phase of the outputted alternating current with that of the other generator.

5. A single-phase three-wire output apparatus for a generator that generates and outputs alternating current through single-phase two-wire output terminals, comprising:
   pseudo two-wire output terminals;
   a magnetic coupler that has a primary side and a secondary side, and is adapted to magnetically couple the single-phase two-wire output terminals with the primary side and the pseudo two-wire output terminals with the secondary side; and
   a connector that is adapted to connect one of the single-phase two-wire output terminals of the generator and one of the pseudo two-wire output terminals, such that single-phase three-wire output terminals being formed by the single-phase two-wire output terminals and the pseudo two-wire output terminals using the connector as a neutral line.

6. The apparatus according to claim 5, wherein the magnetic coupler comprises a single transformer whose turn ratio of the primary side to the secondary side is 1:1.

7. The apparatus according to claim 5, wherein the generator is an engine generator driven by an internal combustion engine and comprising:
   an engine generator unit that generates an alternating current when driven by the engine;
   a converter that is connected to the engine generator and converts the generated alternating current to a direct current; and
   an inverter that is connected to the converter and inverts the direct current to a single-phase alternating current;
   and the single-phase two-wire output terminals are connected to the inverter to output the inverted single-phase alternating current.

* * * * *